United States Patent
Dawkins et al.

(10) Patent No.: US 10,200,407 B1
(45) Date of Patent: Feb. 5, 2019

(54) NETWORK GATEWAY MESSAGING SYSTEMS AND METHODS

(71) Applicants: Jerald Dawkins, Tulsa, OK (US); Justin Stanley, Bixby, OK (US)

(72) Inventors: Jerald Dawkins, Tulsa, OK (US); Justin Stanley, Bixby, OK (US)

(73) Assignee: TokenEx, LLC, Edmond, OK (US)

( * ) Notice: Subject to any disclaimer, the term of this patent is extended or adjusted under 35 U.S.C. 154(b) by 115 days.

(21) Appl. No.: 15/051,614

(22) Filed: Feb. 23, 2016

(51) Int. Cl.
  *H04L 29/06* (2006.01)
  *H04L 12/58* (2006.01)

(52) U.S. Cl.
  CPC ............ *H04L 63/164* (2013.01); *H04L 51/14* (2013.01); *H04L 51/30* (2013.01); *H04L 63/083* (2013.01)

(58) Field of Classification Search
  CPC ....... H04L 63/164; H04L 63/14; H04L 63/30; H04L 63/083
  USPC ........................................................... 726/6
  See application file for complete search history.

(56) References Cited

U.S. PATENT DOCUMENTS

| | | | | |
|---|---|---|---|---|
| 8,976,791 | B1* | 3/2015 | Sivan | H04L 12/4625 370/392 |
| 2005/0138426 | A1* | 6/2005 | Styslinger | H04L 63/0281 726/4 |
| 2010/0121961 | A1* | 5/2010 | Elleuch | H04L 12/1822 709/228 |
| 2011/0321148 | A1* | 12/2011 | Gluck | H04L 63/0209 726/9 |
| 2012/0255036 | A1* | 10/2012 | Kidder | H04L 63/08 726/29 |
| 2014/0032418 | A1* | 1/2014 | Weber | G06Q 20/085 705/77 |
| 2016/0164840 | A1* | 6/2016 | Robertson | H04L 63/0281 726/12 |
| 2016/0337333 | A1* | 11/2016 | Rollet | H04L 63/08 |
| 2017/0017959 | A1* | 1/2017 | Keresman, III | G06Q 20/40 |
| 2017/0093812 | A1* | 3/2017 | Schenk | H04L 63/0428 |

* cited by examiner

Primary Examiner — Dant B Shaifer Harriman
(74) Attorney, Agent, or Firm — John M. Behles (57) ABSTRACT

Embodiments of the present disclosure relate to network gateway based messaging systems and methods. Some methods include transparent message processing that includes receiving a message from a first party that includes a payload and a token. The token is associated with sensitive information. Next, the method includes replacing the token with the sensitive information within the message and forwarding the message with the sensitive information to a second party. The payload is unaffected by the token exchange process.

13 Claims, 5 Drawing Sheets

NETWORK GATEWAY MESSAGING SYSTEMS AND METHODS

FIELD OF THE PRESENT DISCLOSURE

The present disclosure relates generally to data security, and more specifically, but not by limitation, to systems and methods for network based messaging that allows for the transmission of messages between end points in which a replacement of message information or elements occurs during the transmission process.

SUMMARY

Embodiments of the present disclosure include a method, comprising: (a) receiving a message from a first party that comprises a payload comprising a token and content destined for a second party, the token being associated with sensitive information; (b) replacing the token with the sensitive information within the payload; and (c) forwarding the message with the sensitive information to the second party.

Some embodiments comprise receiving a tokenization request that includes a single instance of sensitive information, or a batch request that includes a plurality of sensitive information. Each instance of sensitive information can be replaced in the request with a token that is generated for the sensitive information. The request is then passed back to the requesting party. To be sure, the original format of the request remains the same, with the exception that the sensitive information has been exchanged for a corresponding token. The sensitive information is mapped to its particular location in the original request, and the token is replaced at that particular location. When the requesting party knows that a customer's sensitive information is placed into the request at location X, the requesting party can determine when the gateway returns the request that the token that replaced the sensitive information belongs to the customer. That is, the locality of the sensitive information/token can be used to map a token back to a customer when the requesting party records the location of the sensitive information of the customer in the request. This is particularly helpful when the request is a batch request that includes many instances of sensitive information for one or more customers.

Other embodiments of the present disclosure include a system, comprising: (a) a client executing a gateway messaging application; and (b) a network gateway coupled to the client, the network gateway being configured to: (i) receive a message from the client that comprises a payload and a token, the token representing sensitive information; (ii) apply a token replacement scheme to the message to locate the token; (iii) replace the token with the sensitive information; and (iv) forward the message with the sensitive information to a receiving system without altering the payload.

Additional embodiments of the present disclosure include a system, comprising: (a) a processor; and (b) a memory storing logic that is executable by the processor to: (i) receive a message from the client that comprises a payload and a token, the token representing sensitive information, the message comprising: (1) an endpoint that directs the message to a network gateway; authentication credentials; (2) a token locator that identifies a location of the token within the payload; and (3) authenticate the client with the authentication credentials; (ii) replace the token with the sensitive information; and (iii) forward the message with the sensitive information to a receiving system.

Some embodiments comprise a computer readable medium that is embedded with logic that performs any of the methods described in this disclosure.

BRIEF DESCRIPTION OF THE DRAWINGS

Certain embodiments of the present disclosure are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The present disclosure is directed in general to systems and methods for network based messaging that allows for the transmission of messages between end points in which a replacement of message information or elements occurs during the transmission process. In one embodiment the receipt of a message occurs by a network gateway.

The message can include any payload that is destined for a receiving party. The receiving party desires to receive not only the payload in the message, but also sensitive information. This sensitive information, if possessed by the sending party might subject the sending party to compliance with one or more local, state, federal, or international regulations. Rather than sending the required sensitive information in the message, the sending party includes a token in the message that is linked to the sensitive information. The sending party can transmit the message with the token to a network gateway that processes the message. The token can be embedded into the payload in some embodiments.

According to some embodiments the payload includes a message that is created for a receiving party. The payload can include a content format that is specific to the needs or specifications of the receiving party. The network gateway need not know any requirements or specifications of the receiving party to facilitate the message processes of the present disclosure. Thus, the network gateway can facilitate delivery of the message without modifying the structure of the payload, in some embodiments.

The token is placed into the payload in a location that conforms to the requirements or specifications of the receiving party. The token functions as a placeholder for the sensitive information and is replaced by the network gateway during message processing.

In some embodiments, the message can comprise an HTTP request that includes the payload. The token is placed into a location in the message. The sending party identifies the location of this token for the network gateway, in some embodiments, using a token replacement scheme that is created between the sending party and the network gateway in advance. The token replacement scheme can be linked to the sending party's authorization credentials. Thus, when the network gateway receives a message and authenticates the sending party, the network gateway uses the token replacement scheme associated with the sending party to locate the token in the message.

While an HTTP request has been used as an example format for a message, the message can generally comprise any network-based protocol request. Other examples include an FTP (File Transfer Protocol) message, NFC (Near Field Communications) message, Bluetooth (low energy) message, SMS (short message system) message, or any other wireless communication message format or protocol.

In some embodiments, a location of the token in the message is incorporated into a specific section of the message that is not the payload, such as a header.

In one embodiment the token is placed into a header of the HTTP request along with other information such as authentication credentials that are used to authenticate the sending party by the network gateway. For example, the network gateway can authenticate the sending party using the authentication credentials to ensure that the network gateway is receiving a message from a party that is authorized to use the token provided in the message. Thus, the presence of the token within the message acts as a two factor authentication process of the sending party.

In some embodiments, the network gateway stores token/sensitive information pairs such that the sending party need not ever have access to the sensitive information; thereby relieving the sending party from more local, state, federal, or international regulations such as HIPAA compliance, PCI compliance, and the like.

As mentioned above, the network gateway is configured to locate the token within the message and replace the token with the sensitive information. The network gateway then forwards the message to a receiving party.

The present disclosure also provides backup or fail safe processes that allow the sending party to route messages directly to the receiving party when the network gateway is inaccessible, otherwise unavailable, or an error occurs in authentication, token replacement, or forwarding—just to name a few.

These and other advantages will be described in greater detail herein with reference to the collective drawings (e.g., FIGS. 1-5).

Figure 1:
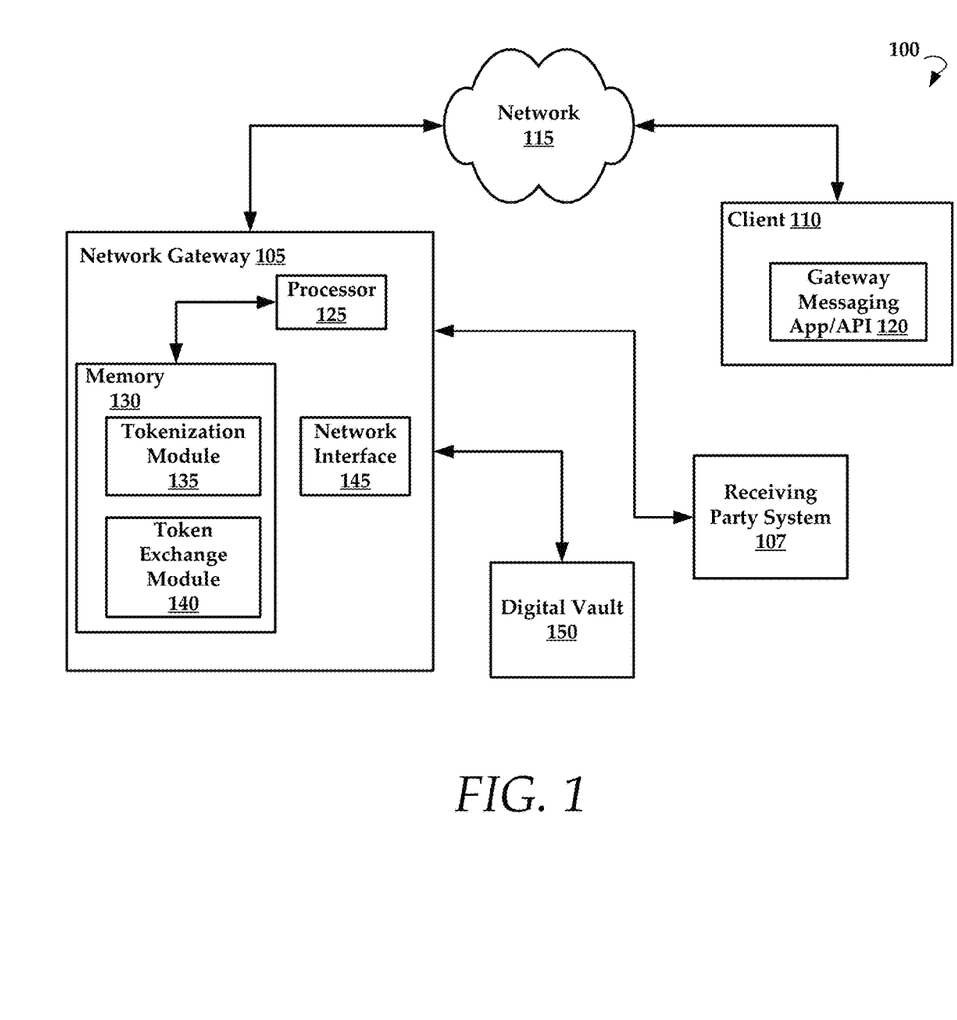
FIG. 1 is a high level schematic diagram of computing architecture for practicing aspects of the present disclosure.

FIG. 1 is a high level schematic diagram of a computing architecture (hereinafter architecture 100) of the present disclosure. The architecture 100 comprises a network gateway 105 (hereinafter also referred to as gateway 105), which in some embodiments comprises a server or cloud-based computing device configured specifically to perform messaging processes described herein. That is, the gateway 105 is a particular purpose computing device that is specifically designed and programmed (e.g., configured or adapted) to perform any of the methods described herein. In essence, the gateway 105 functions as a proxy that processes messages by replacing tokens in the messages with sensitive information.

The gateway 105 is a transparent network gateway, in some embodiments, that processes messages by removing a token (or tokens) previously generated by the gateway 105. Again, the token is included in the message and the token is replaced with the sensitive information that the token represents. The gateway 105 conducts this exchange process transparently to the sending party and a receiving party 107, which increases security. The sending party can perform a message transmission function to a receiving party and a gateway messaging application can sense the presence of a token in the message and perform a routing procedure of the message to the gateway 105 rather than directly to the receiving party.

The gateway 105 can be coupled with a client 110, such as a computer, tablet, Smartphone, or other similar end user computing device. End users can interact with the gateway 105 using the client 110. The client 110 and gateway 105 can be coupled using a network 115. In some embodiments, the client 110 is configured to communicate with the gateway 105 using a client-side application, referred to as a gateway messaging application or API (Application Programming Interface) 120. While an API has been described, one of ordinary skill in the art will appreciate that other communication protocols and methods can likewise be utilized such as standard network traffic messaging.

A suitable network 115 may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

In one embodiment, the gateway 105 comprises a processor 125 and memory 130 for storing instructions. The memory 130 can include a tokenization module 135 and a token exchange module 140. The gateway 105 also comprises a network interface 145 for communicating over the network 115. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Prior to the message processing and transmission aspects of the present disclosure, a pre-negotiated tokenization relationship between a sending party and the gateway 105 can be configured. In some embodiments, the sending party is provided with authentication credentials, such as a unique identifier that allows the gateway 105 to identify the sending party. Rather than storing sensitive information at the client 110; the sending party utilizes the gateway 105 to store the sensitive information.

The gateway 105 can receive the sensitive information from a party that engages with the sending party, such as a customer, client, or other entity. The gateway 105 engages the tokenization module 135 to tokenize the sensitive information. Tokenization comprises any process (referred to as a token scheme) whereby sensitive information is processed to create a token that comprises any string of characters that cannot be processed by anyone other than a party that possesses the token and sensitive information, which in this example is the gateway 105. The token could be a random generation of characters in one embodiment.

The gateway 105 can receive a tokenization request from the first party. The tokenization request can include sensitive information placed into the tokenization request at a particular location. The gateway 105 utilizes a token scheme to generate a token for the sensitive information and then replaces (switches out) the sensitive information with the token. The gateway 105 then forwards the tokenization request back to the first party, allowing the first party to use the token in a message as described in greater detail herein.

In some embodiments, the gateway 105 can receive a batch file that comprises a plurality of instances of sensitive information, such as separate credit card numbers. The gateway 105 can utilize a token scheme to convert or generate a token for each of the plurality of instances of sensitive information. The gateway 105 replaces the plurality of instances of sensitive information with tokens in a way that maintains locality. Thus, an instance of sensitive information residing within the batch file at a particular location is replaced with a corresponding token that is placed at the same location where the instance of sensitive information existed.

The sending party and gateway 105 can also create a token replacement scheme that defines how the sending party includes a token in a message, and how the gateway 105 determines the placement of the token in the message. For example, the token replacement scheme can comprise a description of a location or position of the token within the payload of an HTTP request. Another example of a token replacement scheme includes wrapping or the encapsulation of the token with token identifying data. In one embodiment the token identifying data includes curly brackets, although any unique character that can be recognized by the gateway 105 can be utilized. For example, the token identifying data can include the placement of a carrot symbol ^ before and/or after the token. Thus, the gateway 105 can parse the message for the token identifying data without being required to know the exact location of the token, as provided by the sending party.

The sending party and receiving party exchange information in the form of a payload, which is included in the message that is processed by the gateway 105. Rather than having the sending party place sensitive information into the payload, the client 110 places a token in the payload that represents the sensitive information.

In some embodiments the payload is tailored to specifications of the receiving party. The payload is a part of the message that is processed by the gateway 105. In some embodiments, a structure of the payload is not altered in any way by the gateway 105. While the structure of the payload is not affected by the gateway 105, the token in the payload is replaced with sensitive information by the gateway 105 prior to forwarding the message to the receiving party 107 and subsequent to receiving the message from the sending party (e.g., client 110).

In some embodiments, the payload utilizes a pre-negotiated content format for the second party (e.g., receiving party).

In some embodiments, the gateway 105 stores the token and its corresponding sensitive information as a pair in a digital vault 150 or database.

After the token is generated it is passed back to the client 110 by the gateway 105. In some embodiments, the gateway can be accessed by a third party that desires to obtain a good or service from the sending party. The third party provides the gateway 105 with their sensitive information. A token is generated for this sensitive information. When the third party desires to conduct a transaction with the sending party the sending party creates a message that includes the token generated for the third party, along with a payload that is formatted for the receiving party.

In other embodiments, the sensitive information is captured using a portal user interface that is displayed on the client 110 or a GUI generated by the client 110 for their customers. The sensitive information is not received by the client 110, but is actually captured by the gateway 105. The token is generated from this captured sensitive information. An example of this includes a customer entering credit card information on a web page provided by the gateway 105. This could include a copy of a web page that appears to be the client 110, but is actually controlled by the gateway 105.

The credit card information is not stored and/or actually received by the client 110, but is received by the gateway 105. The token is generated from this captured sensitive information.

In another example, a third party transacting with the sending party can pre-store their sensitive information with the gateway 105. The client 110 can embed a customer identifier in the message that allows the gateway 105 to locate the correct token (or tokens) generated for the third party. The gateway 105 can share these tokens with the client 110 so that the client 110 can assemble the payload with the tokens as needed.

Figure 2:
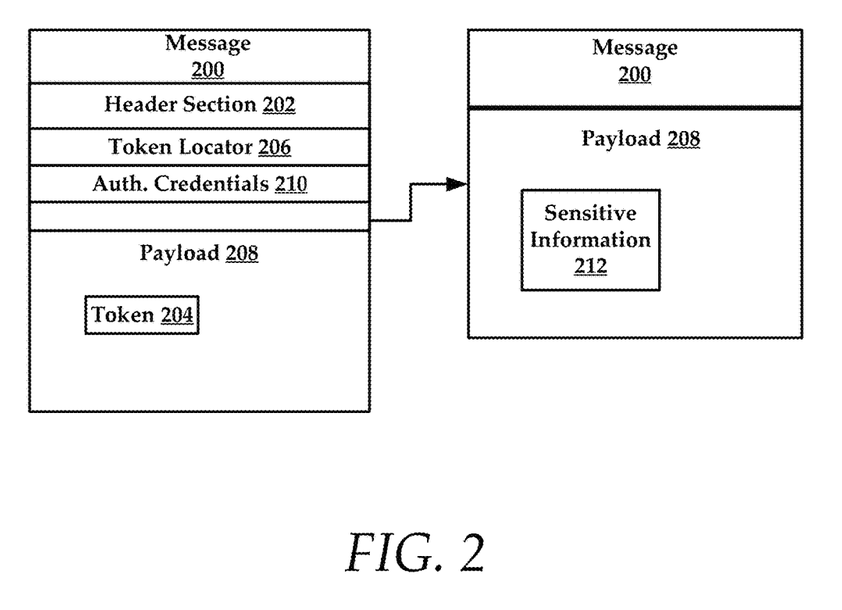
FIG. 2 is example message that comprises a payload and token and a schematic example of a token and sensitive information exchange process of the present disclosure.

Referring briefly now to FIG. 2, in one embodiment, an example message 200 can include an HTTP request, although the message can utilize any message format. The message 200 comprises a header section 202 that includes a token 204, token locator 206 (in some embodiments), payload 208, and authentication credentials 210. These elements of the header section 202 can be in any order desired. In some embodiments, the area around the token 204 is comprised of non-sensitive data that did not need to be tokenized.

In FIGS. 1 and 2 collectively, when the gateway 105 receives the message, the gateway 105 reads the header section 202 of the message and authenticates the sending party using the authentication credentials. Once authenticated, the gateway 105 locates the token using the pre-defined token replacement scheme established for the sending party. To be sure, the gateway 105 selects the proper token replacement scheme based on the authentication of the sending party, in some embodiments.

In other embodiments, the gateway 105 standardizes the token locator format that is used by sending parties. The token locator 206 is included in the header section 202 and can reference a line and position of the token 204 within the payload 208. For example, the token is located on line five, and beings with character 13 and ends with character 21. This token locator could be represented by a tuple of 5, 12, 21. Thus, the token replacement scheme is not required in each embodiment of the present disclosure. The gateway 105 may utilize a standardized token locator 206 that can be read by the gateway 105.

In some embodiments, the client 110 is configured to dynamically or randomly place the token 204 within the payload 208 of the message 200 so as to increase security. The client 110 then creates the token locator 206, which can be read by the gateway 105. This token locator 206 can be identified using token identifying data such as a symbol or curly brackets.

The gateway 105 can utilize the token exchange module 140 to parse the message looking for the dynamically placed token. For example, the gateway 105 looks for token identifying data that wraps the token. The token identifying data can be removed from the payload once the token has been replaced with the sensitive information, in one embodiment.

Once found, the token exchange module 140 of the gateway 105 replaces the token 204 with sensitive information 212 that is linked to the token 204. The message 200, post processing by the gateway 105 is illustrated as well.

As mentioned above, the gateway 105 is configured to exchange/replace the token in the payload with its corresponding sensitive information. The process allows the payload to be transmitted to the second party in an unaltered state, with the exception that the token has been replaced with its sensitive information. Thus, the gateway need not change the structure of the payload, reformat the payload, or change any other part of the payload prior to transmitting the message to the second party. In sum, the gateway 105 can act agnostically to the payload format or content. The gateway 105 is configured to examine the payload for the token using a token replacement scheme (pre-negotiated, standardized placement, or token identifying data), replace the token, and forward the message.

In some embodiments, the gateway 105 can be configured to strip away at least a portion of the header (if present) of the message, such as the token replacement scheme, any authentication credentials and/or the token identifying data, or any other part of the header prior to forwarding the message to the receiving party. This reduces the likelihood that a malicious actor can obtain the authentication credentials of the sending party subsequent to the sensitive information/token exchange process. Thus, even if the sensitive information is exposed, the sensitive information is de-identified because there is no information that can be used to link the sensitive information back to the sending party or a third party with which the sending party is conducting a transaction.

As illustrated in FIG. 2, the header section 202 can be stripped away, leaving the payload 208 that comprises sensitive information 212 (as well as non-sensitive information if present).

According to some embodiments, the present disclosure provides alternate or fall back methods for allowing the sending party to reroute their message directly to the receiving party. By way of example, failures can occur in the above processes such as failure to authenticate the sending party, failure to find a match for a token, and failure to locate the token in the message, and/or the gateway 105 being inaccessible due to hardware failure—just to name a few. Regardless of the type or cause of the failure by the gateway 105, the gateway 105 is unable to forward the message to the receiving party with the token having been exchanged for its sensitive information.

In preparation for these failures, the gateway 105 can provide the sending party with tokens and corresponding sensitive information from the digital vault 150.

Figure 3:
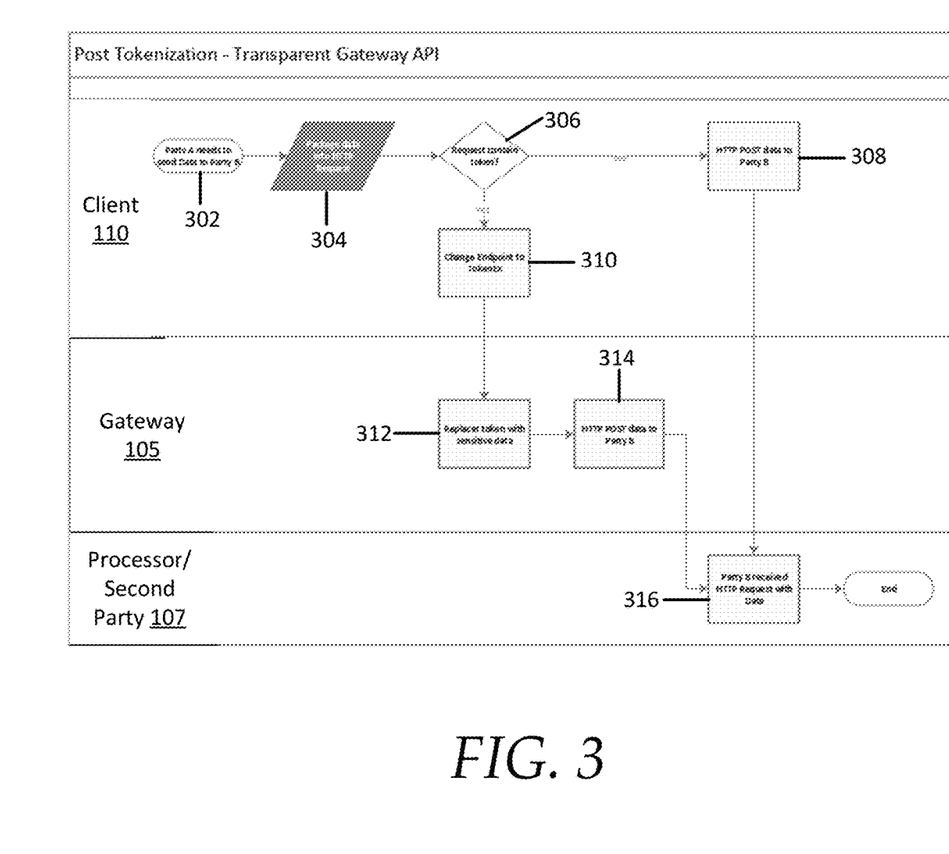
FIG. 3 is a flow diagram of an example messaging method of the present disclosure.

Referring to FIG. 3, a flow diagram of an example messaging method of the present disclosure is provided. Prior to this method, a process of generating a token for a given instance of sensitive information as described above can be implemented.

In some embodiments, a first party desires to send a payload (or other data) to a second party. The method includes a step 302 of preparing the data and a step 304 of formatting the data into an HTTP request. Again, an HTTP request is only an example type of message format that can be used to deliver the data from the first party to the second party. The HTTP request provides a convenient format for including additional information that is used by the gateway to process the message. For example, the HTTP request allows for a header which can be used to place authentication information and a token. In some embodiments, the token is located somewhere in the payload and is identified by its place or location within the payload.

The client can also be configured to examine each message for the presence of a token in step 306. If the message does not comprise a token, the message can be forwarded directly to the second party in step 308 in an HTTP POST process.

Alternatively, if the message does include a token, the client is configured to change an endpoint of the message such that the recipient is the network gateway rather than the second party, in step 310.

In step 312, the network gateway performs a token location process where the network gateway applies a token replacement scheme or otherwise locates the token in the header of the message using, for example, token identifying data in the header. The network gateway replaces the token with corresponding sensitive information in step 314 and then forwards the message with the sensitive information to the second party in step 316.

Messages are not limited to HTTP requests that include a header and payload. In some embodiments, the message can comprise a document that includes fields that can be populated with sensitive information. For example, a W-9 form utilized by the Internal Revenue Service (IRS) includes numerous fields that require sensitive information such as social security numbers, name, address, and so forth.

A sending party desires to transmit a W-9 form to the IRS and fills the W-9 form out using tokens that represent different types of sensitive information for an employee. For example, a first token can be generated for the employee's name, a second token for the address, a third token for the social security number, and so forth. The tokens are placed by the sending party into the required fields on the W-9 form.

The gateway 105 receives this W-9 form and exchanges each of the tokens with their respective sensitive information counterparts. Once complete, the gateway 105 forwards the W-9 form to the IRS.

Thus, the present disclosure allows for the creation and use of document templates that can be populated with tokens that represent sensitive data. The sending party can fill out the document with any non-sensitive information and place tokens in fields that require sensitive information. The gateway 105 can exchange these tokens with their respective sensitive information and forward the document to a receiving party. The gateway 105 can match the tokens to stored tokens in the digital vault and replace tokens without the need to use a token retrieval scheme or the client identifying where in the document the tokens exist.

According to some embodiments, the gateway 105 can be configured to process batch requests that include a plurality of tokens in a message. Each of the tokens can be defined by its place/location in the message. When the gateway 105 receives the message, the gateway 105 finds the position of each of the plurality of tokens and replaces the tokens with their respective sensitive information. The plurality of tokens could include the various segments of sensitive information included in the W-9 for example above.

In sum, various advantages to the present disclosure are described herein. The network gateway allows merchants to leverage their existing gateway integrations without requiring the merchant to detokenize data. The network gateway can function as a HTTP relay as a forward proxy. Rather that POSTing the transaction payload to the receiving party, the sending party will post the transaction payload to the network gateway with one or more additional HTTP headers. The network gateway inspects the HTTP message body and replaces the token with the sensitive information such as a PAN. The network gateway forwards to the receiving party. The network gateway receives the response and returns the response in the same format to the sending party. The sending party's application code remains the same other than the appending of HTTP headers to the transaction request.

The network gateway supports JSON, XML, and URL-form-encoded, or other similar HTTP POST procedure.

The network gateway implements 'token replacement schemes' to facilitate multi-data set acceptance without obstructing business processes or existing applications. A token replacement scheme encapsulates validation of input data as well as a format of the token returned to the sending party or token requester.

By way of example, if the sending party complies with business requirements that hinge upon the PAN number of a credit card, you could use a format preserving Token replacement scheme that will retain the first six digits of the input data. This allows the sending party's existing business logic to remain intact while still securing your data with a network gateway.

Token replacement schemes can be either multi-use or single use. With a multi-use token replacement scheme, the relationship between the token and input data (e.g., sensitive information) has a one to one mapping. In order words, if the same input data is provided multiple times, the same token value is returned each time. In contrast, with a single use token replacement scheme, a new token value is generated by the gateway each time.

In an example use case, an energy sector company desires to address risks associated with Personal Identifiable Information (PII, or most commonly known as Social Security Numbers). The company desires to retain royalty owner (the people that own the mineral rights) PII in order to process payments and submit IRS documentation. The sensitive information could be bank account information or social security numbers. As a corollary, cyber insurance providers are asking questions about how protected that PII is and multiple risk assessment activities have demonstrated several vulnerabilities that would be very costly to address. Even if properly addressed, the risk associated with retaining that sensitive data will always be there.

To alleviate this risk or eliminate the risk the gateway system is implemented. The gateway decouples sensitive data. A social security number is important to a malicious entity, but what makes it more usable by the malicious actor is a name associated with the social security number.

A social security number alone is not completely sensitive, just like a name alone is not completely sensitive, but together these two data points become extremely valuable and can be used for various fraudulent transactions.

Thus, the network gateway can decouple the sensitive data to create unidentifiable data segments. A name without a social security number or a social security number without a name. For this scenario, the network gateway 105 can retain social security numbers and provide the energy company with a token. The token can be used within all energy company internal systems, processes, and other forms without the fear of data compromise or disclosure.

In cases where a social security number or other PII needs to be coupled with a name, for example communication to the IRS for tax purpose, the energy company can generate standard reports and use the network gateway to submit the detokenized required forms or data to the appropriate individual (e.g. the IRS or to the bank for wire transfer, etc.).

Another use case involves medical entities. A problem with medical data security is that the organizations that hold or access medical data (e.g. Healthcare providers and Health exchanges) are bound by strict HIPAA regulations that prevent or hinder the ability to share information. However, with meaningful use, technology (such as the transparent gateway) can be used to solve health problems from efficiency gains to advanced big-data research. So the researchers and various other companies that want the data hold too much risk associated with the data—data owners won't release the information.

Therefore, the network gateway can be used to decouple the sensitive data. An X-ray alone is not sensitive. Release of an X-ray coupled with a name, however would require an OCR breach disclosure. The network gateway can generate a token that decouples the x-ray data from the information that identifies it to an individual, while maintaining referential integrity for researchers or other organizations that can make additional use of this information.

In yet another example, party A is an organization that has employed tokenization to reduce risk/regulatory compliance obligations associated with the storing sensitive data in their systems. Party A has a relationship with Party B that requires Party A to transmit information to Party B via HTTP Request. Some of the information contained in this request/payload is sensitive and has been tokenized.

Since Party A no longer has the actual values of the sensitive data set, Party A cannot directly furnish this information to Party B in the HTTP Request.

Party A could detokenize, or retrieve the sensitive data from the network gateway, but that would bring data back into their environment. Thus, Party A leverages a network gateway API which allows Party A to send data to Party B without having to Detokenize or make major modifications to the applications that interface with Party B, such as a credit card reader or point of sale terminal.

Party A's client will construct the exact same HTTP Request that it did before implementing tokenization. Rather than POSTing this request directly to Party B, they will POST the request to the network gateway. The network gateway replaces the token for the sensitive data, and relays the request to Party B. The end result is Party A can operate using tokens, and can provide the required data to Party B.

Figure 4:
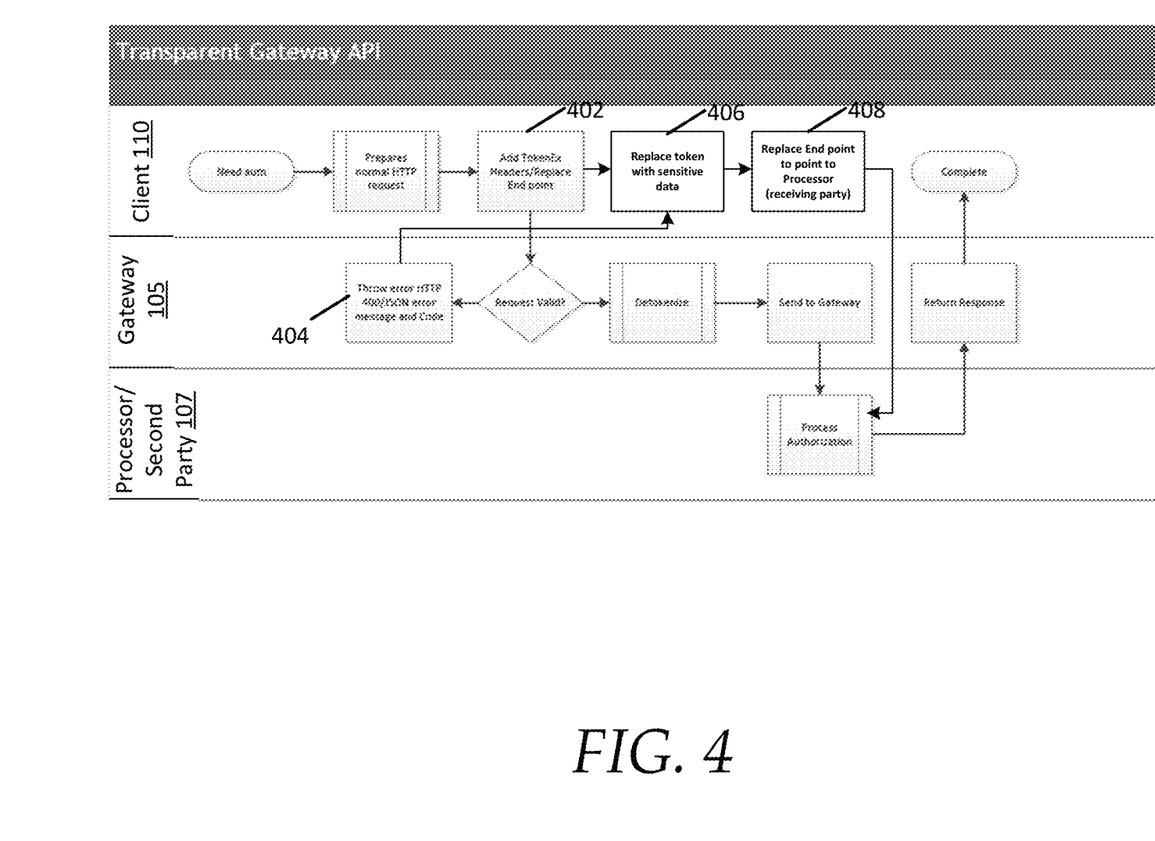
FIG. 4 is a flow chart of an example failover procedure.

In FIG. 4, the client 110 can be configured through use of the gateway messaging application 120 to perform the exchange process instead of the gateway 105 and transmit the message directly to the receiving party. Thus, the client 110 first attempts to send the message to the gateway 105 for processing in step 402 (after preparing the network request and adding a header to the message which includes the token replacement scheme, as well as defining the gateway as the end point), when a failure message is received by the client 110 in step 404, the client 110 can select to replace the token with the sensitive data in step 406, rather than relying on the gateway 105. The client 110 also replaces the end point of the message, which previously pointed to the gateway 105. The end point is changed to point to the processor/second party 107. The client then transmits the message directly to the receiving party in step 408 after replacing of the end point.

This process can expose the sending party to certain local, state, federal, or international compliance requirements, but the nature of the transaction might be compelling enough for the sending party to perform the transaction rather than wait for the gateway 105 to function properly.

Figure 5:
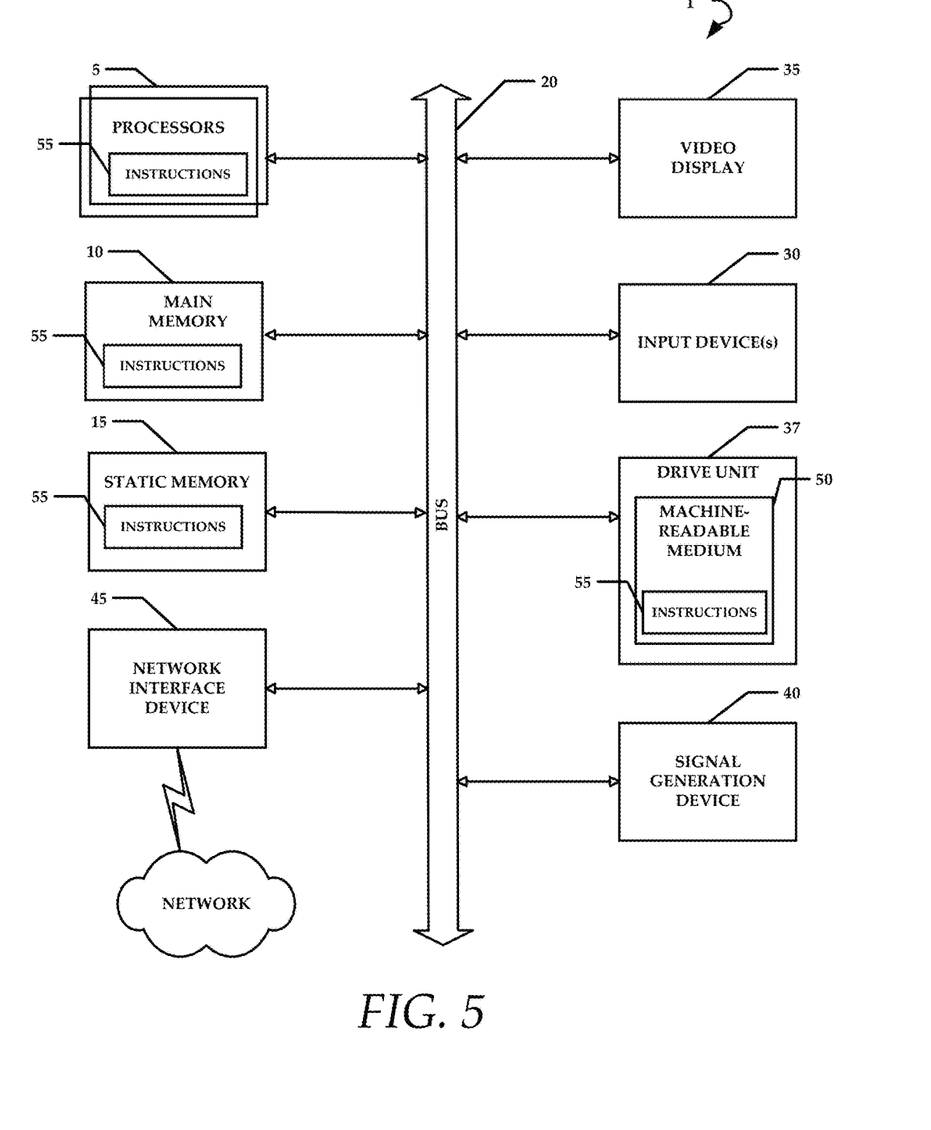
FIG. 5 is a schematic diagram of a computing system that is used to implement embodiments according to the present disclosure.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 105B or network 520, see FIG. 1 and FIG. 5, respectively) via the network interface device 45 utilizing any one of a number of well-known transfer protocols (e.g., Hyper Text Transfer Protocol structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   executing instructions by a processor of a network gateway to:
   receive a message from a first party that comprises a payload comprising a token and content destined for a second party, the token being associated with sensitive information, the message comprising a network-based protocol request and a token replacement scheme, the token replacement scheme is indicative of a location of the token within the message and specifies a format of the token;
   locate the token in the message using the token replacement scheme;
   replace the token with the sensitive information within the payload; and
   forward the message with the sensitive information to the second party.

2. The method according to claim 1, wherein the token replacement scheme is incorporated into a header of the network-based protocol request or another location in the message that is not the payload.

3. The method according to claim 1, wherein the processor further executes the instructions to generate a token replacement scheme by the first party; and
   applying the token replacement scheme, by a network gateway, to locate the token within the payload.

4. The method according to claim 1, wherein the processor further executes the instructions to store the token and the sensitive information in a digital vault of the network gateway prior to receiving the message from the first party.

5. The method according to claim 1, wherein the processor further executes the instructions to:
- receive a tokenization request that comprises the sensitive information;
- generate the token from the sensitive information;
- replace the sensitive information in the tokenization request with the token at a location of the sensitive information; and
- transmit the tokenization request back to the first party that includes the token in place of the sensitive information.

6. The method according to claim 1, wherein the payload comprises a pre-negotiated message format for the second party.

7. The method according to claim 1, wherein the processor further executes the instructions to transmit the token or the sensitive information to the first party from a digital vault.

8. The method according to claim 7, further comprising receiving, by the first party using a first party system, a failure message that indicates that the network gateway has failed to forward the message.

9. The method according to claim 8, further comprising:
- replacing, by the first party using the first party system, the token with the sensitive information; and
- transmitting, by the first party using the first party system, the message directly to the second party when the first party receives the failure message.

10. The method according to claim 1, wherein the processor further executes the instructions to apply a token replacement scheme to the message to locate the token, wherein the token is located at a particular location within the message and the token replacement scheme comprises instructions for finding the location of the token.

11. The method according to claim 1, wherein the token is embedded and wrapped with token identifying data; and a network gateway locates the token by searching the message for the token identifying data or locating the token using a pre-negotiated token replacement scheme.

12. A system, comprising:
- a processor; and
- a memory storing logic that is executable by the processor to:
  - receive a message from a client that comprises a payload and a token, the token representing sensitive information, the message comprising:
    - an endpoint that directs the message to a network gateway;
    - authentication credentials; and
    - content destined for a second party, the token being associated with sensitive information;
    - a network-based protocol request; and
    - a token replacement scheme, the token replacement scheme being indicative of a location of a token within the message and a format of the token, the token representing sensitive information;
  - authenticate the client with the authentication credentials;
  - replace the token with the sensitive information using the location specified by the token replacement scheme; and
  - forward the message with the sensitive information to a receiving system.

13. The system according to claim 12, wherein the message comprises a header and the endpoint, authentication credentials, and token locator reside in a header of the message, further wherein the system is configured to remove the header from the message prior to forwarding to the receiving system.

* * * * *